United States Patent [19]

Curtin et al.

[11] Patent Number: 5,447,976

[45] Date of Patent: Sep. 5, 1995

[54] RUBBER COMPOSITION CONTAINING BLENDS OF NATURAL RUBBER AND EPOXIDIZED NATURAL RUBBER

[75] Inventors: Patrick J. Curtin; Timothy M. Lipinski, both of Rocky Mount, N.C.; William E. Russell, Middletown, R.I.

[73] Assignee: The Moore Company, Westerly, R.I.

[21] Appl. No.: 279,827

[22] Filed: Jul. 25, 1994

Related U.S. Application Data

[63] Continuation-in-part of Ser. No. 940,247, Sep. 4, 1992, abandoned.

[51] Int. Cl.$^6$ .................... C08L 15/00; C08L 7/00; C08K 3/18
[52] U.S. Cl. .................... 523/438; 523/437; 525/122; 525/194
[58] Field of Search .............. 523/437, 438; 525/122, 525/194

[56] References Cited

U.S. PATENT DOCUMENTS

| | | |
|---|---|---|
| 4,341,672 | 6/1982 | Hsieh et al. . |
| 4,359,497 | 11/1982 | Magder et al. . |
| 4,366,289 | 12/1982 | Keskkula et al. .................... 525/78 |
| 4,528,340 | 6/1985 | Hayashi et al. . |
| 4,621,121 | 11/1986 | Schwarze et al. . |
| 4,673,741 | 6/1987 | Schwarze et al. . |
| 4,674,622 | 6/1987 | Utsunomiya et al. . |
| 4,769,416 | 9/1988 | Gelling et al. . |
| 4,829,124 | 5/1989 | Clark . |
| 4,843,129 | 6/1989 | Spenadel et al. . |
| 4,859,735 | 8/1989 | Vu . |
| 4,898,223 | 2/1990 | Botzman et al. .................... 154/547 |
| 4,992,513 | 2/1991 | Bauer et al. . |
| 5,011,891 | 4/1991 | Spenadel et al. . |
| 5,030,695 | 7/1991 | Cozewith et al. . |
| 5,093,426 | 3/1992 | Sakabe et al. . |

FOREIGN PATENT DOCUMENTS 3126737 5/1991 Japan .

OTHER PUBLICATIONS

*Processing Morphology and Properties,* Martuscelli, et al., Polymer Blends, Plenum Press, New York, N.Y. pp. 2–3, 1980.

"Expoxidation of Natural Rubber Latices: Methods of Preparation and Properties of Modified Rubbers," from the Journal of Applied Polymer Science, vol. 29, 1661–1673 (1984), by David R. Burfield, Kooi-Ling Lim, and Kia-Sang Law.

"Epoxidized natural rubber in PVC-rubber composites," from NR Technology, vol. 16, Part 1, 1985.

"Differential Scanning Calorimetry Study of Natural Rubber and Epoxidized Natural Rubber and Their Binary Blends," by S. C. Ng and K. K. Chee, Department of Chemistry, University of Malaya,, 59100 Kuala Lumpur, Malaysia. Rubber Chemistry and Technology, vol. 62.

"Solubility Parameters of Epoxidised Natural Rubber," by I. R. Gelling et al.: *J. Nat. Rubb. Res.,* 6(1) 20–29 (1991).

*Primary Examiner*—John C. Bleutge
*Assistant Examiner*—D. R. Wilson
*Attorney, Agent, or Firm*—Darby & Darby

[57] ABSTRACT

An elastic composite is provided having natural rubber and epoxidized natural rubber components. Compared to known composites, the present composition achieves reduced oil swell and absorption, lower permanent set, lower modulus of elasticity, and high tear strength. When formed in a tape, the composition is extremely useful for legbands, straps and contours of swimwear and other garments.

8 Claims, No Drawings

RUBBER COMPOSITION CONTAINING BLENDS OF NATURAL RUBBER AND EPOXIDIZED NATURAL RUBBER

This is a continuation-in-part of application Ser. No. 07/940,247, filed Sep. 4, 1992, now abandoned.

FIELD OF THE INVENTION

The present invention relates to elastomeric compositions comprising blends of epoxidized natural rubber and natural rubber.

BACKGROUND OF THE INVENTION

The various situations requiring elastic materials have led to the development of a wide range of natural and synthetic rubbers. Many of the more demanding situations have required blends of these rubbers to provide the proper mix of characteristics. For example, vehicle tires often include styrene-butadiene rubber (SBR), which is the most common synthetic elastomer, polybutadiene (BR), and even natural rubber. The characteristics usually associated with natural rubber, i.e., abrasion resistance, resilience, good high- and low-temperature performance, and tear strength are ideal for tires and similar applications, which experience great punishment.

However, other environments have less demanding strength requirements, but make other strict demands on elastomers. For example, in the clothing industry, elastomers used for form fitting clothing have a unique set of requirements. These include a low stretch modulus, high dimensional stability (to retain the article's shape), low permanent set (to avoid losing the snug fit of a garment), and tear resistance (to avoid tearing while being punctured by the sewing needle). These demands are compounded, for example, when the garment is swimwear. In this area, in addition to the clothing fit requirements, the garment may be exposed to large amounts of sunlight, chlorine from pool water, salt-water, and oils from body perspiration and sun protection lotions.

A common choice of elastomer for clothing elastication purposes is natural rubber (cis-1,4-polyisoprene). It provides excellent elongation properties, can be made soft, has very good tear resistance and is strong. However, it is severely deficient in resistance to sunlight, oils, or chlorine. A common synthetic substitute for natural rubber in clothing is Neoprene tape, which has excellent resistance to oil, ozone, abrasion and solvents. Unfortunately, the neoprene is not as elastic as the natural rubber, and it takes a permanent set when it stretches that can range up to 25%, which greatly distorts a garment. Neoprene is also much more expensive than natural rubber and has a lower yield due to its higher specific gravity.

In recent years, a new type of elastomer has become available, namely epoxidized natural rubber (ENR). ENR is usually produced by the chemical modification of natural rubber latex with peroxycarboxylic acids. A key advantage gained by this modification is increased resistance to swelling by hydrocarbon oils and solvents. ENR also has excellent tensile strength and fatigue properties. In addition, a high degree of reinforcement may be obtained with silica fillers, even in the absence of a coupling agent. However, the surface characteristics (i.e., the look and feel) of the epoxidized natural rubber do not match those of natural rubber, making epoxidized natural rubber a less than ideal choice for garments. Epoxidized natural rubber is also more difficult to sew than natural rubber, partly because of a tendency to tear due to the sewing needle. ENR also has an undesirably high permanent set.

To take advantage of the benefits of both the natural rubber and the epoxidized natural rubber, a hybrid would be ideal. However, it has been found that the specific interactions between the hydrogens of isoprene units (in the natural rubber) and the oxirane oxygens of epoxidized isoprene moieties (in the ENR), are weak. Previous tests have shown that the two materials do not mix well. Without proper uniformity in the attempted blends, it has been difficult to form a blend that has consistent properties needed for applications such as vehicle tires or footwear. In Japanese patent application 1992-126737, a composition of ENR and natural rubber is disclosed, although large percentages of carbon black and oils are necessary to produce the tire treads disclosed therein.

It is thus an object of the invention to provide a composition for use in elastication of garments that has the superior qualities of both natural rubber and epoxidized natural rubber.

It is another object that the composition have high chlorine, salt-water, and oil resistance; a low permanent set; snug gather; and resistance to sunlight exposure.

It is a further object of the invention to provide a composition that attains the desired properties, while being cost-efficient.

SUMMARY OF THE INVENTION

In view of the foregoing objects, an elastic composite is provided having natural rubber and epoxidized natural rubber components that are blended together in proportions described below. When formed in a tape, the composition is extremely useful for legbands, straps and contours of swimwear and other garments.

The foregoing and other objects and advantages will become apparent to those skilled in the art upon reading the following detailed description of the preferred embodiments.

DETAILED DESCRIPTION OF THE PREFERRED EMBODIMENTS

According to the invention, a composition comprising a component of natural rubber and a component of epoxidized natural rubber (ENR) is provided. Usually, epoxidized natural rubber is epoxidized in solution by acids, such as perbenzoic, perphthallic, and peracetic acids. The two most commonly available forms of ENR are ENR25 (25 mole % epoxidized) and ENR50 (50 mole % epoxidized), now available from Guthrie, Inc. of Malaysia. Other grades of epoxidized natural rubber may be used.

The natural rubber component is preferably supplied in a bulk crumb form. The natural rubber and epoxidized natural rubber are mixed in a BANBURY internal heated mixer for a time sufficient to mix the two components into a uniform blend, although it is assumed that the mixing only occurs on the granular level, and not the molecular level. The resulting blends have a high degree of homogeneity. Other conventional mixers, such as an open mill mixer, rubber mill, Brabender mixer, or twin-screw continuous mixer may also be used.

While the mixing continues, additional ingredients are added. Such ingredients may include, but are not limited to, accelerators, antioxidants, prevulcanization inhibitors, reinforcement fibers, pigments, dyes, and process oils. These and other processing aids are added in normal fashion depending on the specific mixing protocol used. Such techniques are well known to those skilled in the art. The specific components and their parts per hundred rubber are shown in Table 1. Alternate vulcanizing/accelerator combinations commonly used for rubber compounding may also be used with similar results.

TABLE 1

| INGREDIENT | PARTS PER HUNDRED RUBBER | | | |
|---|---|---|---|---|
| | Preferred Ranges | Embodiment #1 | Embodiment #2 | Embodiment #3 |
| Crumb Natural Rubber | 25.00–65.00 | 50.00 | 47.50 | 30.00 |
| ENR | 35.00–75.00 | 50.00 | 47.50 | 50.00 |
| Antioxidant | 0.75–1.50 | 1.25 | 1.25 | 1.25 |
| Activators | 3.50–6.50 | 5.00 | 5.00 | 4.00 |
| Fillers | 7.00–60.00 | 31.00 | 31.00 | 30.00 |
| Accelerators | 1.25–3.75 | 2.55 | 2.55 | 2.36 |
| Pigment | 0.25–1.00 | 0.47 | 0.47 | 0.0 |
| Vulcanizing Agents | 0.65–1.80 | 0.98 | 0.98 | 2.00 |
| Methacrylate Grafted NR | 0.00–10.00 | 0.00 | 5.00 | 0.00 |
| EPDM | 10.00–35.00 | 0.00 | 0.00 | 20.00 |

The filler listed may be a talc or calcium carbonate or other soft filler and may include titanium dioxide, which can be totally or partially replaced with Silica filler and/or clays. For some applications, it is contemplated that up to 60 parts per hundred rubber of filler might be used. EPDM is an ozone-resistance agent—EPDM terpolymer (ethylene—propylene/diene monomer). A preferred EPDM is Royalene 525, available from Uniroyal. Conventional antioxidants, such as those from the hindered phenol family, may be used. A prevulcanization inhibitor, such as N-(cyclohexyl-thio)phthalimide sold under the tradename Santogard PVI by Monsanto, may optionally be employed. If desired a process oil or extender, such as naphthenic acid, may be added.

The activator preferably includes zinc oxide and stearic acid. The accelerators preferably include benzothiazyl disulfide and di-morpholino disulfide. The vulcanizing agents preferably include sulfur and alkyl phenol disulfide.

In the case of the second embodiment of the invention, methacrylate grafted NR (MGNR) is added as a compatibility improvement agent. MGNR may be obtained from Heveatex of Rhode Island. Both the natural rubber and epoxidized natural rubber exhibit increased compatibility with the MGNR than with each other, so the MGNR acts as a bridge to improve the bond between adjacent grains of natural rubber and epoxidized natural rubber. Compatabilizing agents other than MGNR can also be used, such as other graft or block copolymers that preferably have at least one segment which is compatible with the natural rubber being used and at least one segment that is compatible with epoxidized natural rubber. An example is SIS (styrene-isoprene-styrene) copolymer.

The preferred epoxidation level of the ENR is 50. Since ENR with varied epoxidation levels can be produced, it is preferred that the amount of the ENR satisfy the following equation:

$$1.75 \leq \frac{(\% \text{ mol } (ENR)) \cdot (pph \ (ENR))}{1000} \leq 3.75$$

wherein % mole (ENR) is the mole % epoxidation level of the ENR and pph (ENR) is the parts per hundred rubber of the ENR. While the level of epoxidation may be varied and still satisfy the equation, it is preferred that the pph(ENR) remain within the range of about 35 to about 75. After the composition is well blended, it is calendared to form a thin sheet of predetermined thickness, depending on the desired application (between about 0.010 and about 0.040 inches in thickness). The sheet is then cured, e.g. by continuous extrusion through a hot air oven. The cured sheet is then slit into tape form. Various widths of tape are prepared to meet different requirements for use in garments, e.g., arm bands, waist bands and leg bands. The tape is desirably slit into widths of between about 1/16 and 1 inch. The tape may then be festooned in continuous length into a box for shipping. Alternatively, the tape may be spooled.

As can be seen in Table 2, the first and second embodiments according to the present invention provide as good or better elasticity than natural rubber alone or neoprene. The oil resistance of the two compositions, as measured by the growth in the volume of a sample (oil swell %) and the rise in percentage weight over time (oil absorption %) is from 2 to 10 times better than natural rubber alone. The oil properties can be determined in a known manner, such as by immersion in oil for several hours. Suitable oils for immersion are desirably selected from those likely to be encountered by a garment while worn, e.g., baby oil, tanning oil, and sunblock formulations.

TABLE 2

| | Embodiment no. 1 | Embodiment no. 2 | NR | NEOPRENE |
|---|---|---|---|---|
| Modulus of Elasticity @100% (PSI) | 170 +/− 20 | 190 +/− 20 | 180–240 | 220–280 |
| Oil Swell (%) | 5 +/− 1 | 2 +/− 1 | 13–15 | n.a. |
| Oil Absorption (%) | 10 +/− 2 | 4.5 +/− 2 | 35–40 | 4–7 |
| Permanent Set (%) | 7 +/− 2 | 8 +/− 2 | 7–14 | 17–22 |

As shown in Table 2, the present compositions exhibit a lower modulus of elasticity with respect to either natural rubber alone or neoprene. The oil swell and oil absorption properties are also lower than natural rubber, and in the case of embodiment No. 2, lower than both.

The permanent set, i.e., the non-recoverable stretch, of the ENR-NR compositions is half that for neoprene and lower than that for natural rubber alone. Although not shown in table 2, the tear strength of the present compositions is higher than for ENR alone. Whereas most common elastomers used in swimwear turn yellow after prolonged exposure to light and/or chlorinated pool water, the ENR-NR compositions turn bluer, adding to the aesthetic appeal of the ENR-NR compositions.

Thus, the composition of the present invention is particularly useful in forming an article of manufacture that achieves several optimum properties simultaneously. Previous compositions provided benefits in terms of one or two properties while lacking in others. Specifically, the composition can be used in an article that has the advantageous properties of low oil swell and oil absorption, low permanent set, low modulus of elasticity, and high tear strength. In the preferred embodiment, the composition of the present invention can be use in the manufacture of garments, such as swimwear, which would take advantage of the enhanced properties of the present composition.

Another preferred embodiment of the present invention (Embodiment No. 3 in Table 2) is described below. This embodiment incorporates an agent to enhance the oil resistance and ozone resistance of the elastic composition. Ozone resistance is important to prevent degradation of the composition upon extended exposure to low concentrations of ozone which may be present in the atmosphere. For example, for garments displayed in a store window, fluorescent lamps tend to increase local ozone levels. In Table 3 below, a natural rubber-EPDM elastic tape exhibiting ozone resistance (Control), is compared to inventive Embodiment No. 3.

TABLE 3

| PHYSICAL PROPERTIES | CONTROL | Embodiment #3 |
| --- | --- | --- |
| Modulus 100% psi | 238 | 182 |
| Modulus 200% psi | 403 | 318 |
| Modulus 300% psi | 656 | 492 |
| Permanent Set % | 18.0 | 13.5 |
| Heat age % Retained | 95.0 | 85.0 |
| Oil Swell (4 hr.) % | 19.6 | 8.3 |
| Oil Absorption % | 74.0 | 31.0 |
| Ozone Exposure (12 weeks) Test | no cracks | no cracks |

As can be seen from Table 3, the inventive elastomer (Embodiment No. 3) containing both EPDM and ENR-50 is ozone-resistant. However, the oil absorption and oil swell properties of the inventive elastomer are greatly improved compared with the control.

The ozone exposure test was conducted by subjecting the elastomer sample in tape form to 20% elongation, and exposing the sample to an air environment containing a sufficient concentration of ozone to degrade natural rubber over a one-week period. After the 12-week test period, the sample is visually examined for cracking and or deterioration.

While the embodiments shown and described are fully capable of achieving the objects and advantages of the invention, it is to be understood that these embodiments are shown and described for the purpose of illustration and not for the purpose of limitation.

What is claimed is:

1. An elastomeric composition consisting essentially of a component of epoxidized natural rubber (ENR) and a component of natural rubber, the amount of the component of ENR being given by the formula:

$$1.75 \leq \frac{(\% \text{ mol } (ENR)) \cdot (pph \ (ENR))}{1000} \leq 3.75$$

wherein the % mol (ENR) is the mole % epoxidation of the ENR;
wherein the pph(ENR) is the parts per hundred total rubber of the ENR and the pph(ENR) is between about 35 and about 75; and
a component of non-reinforcing filler in the amount ranging between about 7 and about 40 parts per hundred total rubber.

2. An elastomeric composition according to claim 1, wherein the % mol(ENR) is about 50.

3. An elastomeric composition according to claim 2, wherein said pph(ENR) is about 50.

4. An elastomeric composition according to claim 3, wherein the amount in parts per hundred rubber of said natural rubber is substantially equal to the amount of ENR.

5. An elastomeric composition according to claim 1, wherein said component of non-reinforcing filler is a mineral filler in the amount of about 30 parts per hundred total rubber.

6. An elastomeric composition according to claim 5, wherein said non-reinforcing filler is a member selected from the group consisting of titanium dioxide, silica, clay, talc, calcium carbonate, and mixtures thereof.

7. An article of manufacture having reduced oil swell and oil absorption, lower permanent set, lower modulus of elasticity, and high tear strength, consisting essentially of:
a component of epoxidized natural rubber (ENR) and a component of natural rubber, the amount of the component of ENR being given by the formula:

$$1.75 \leq \frac{(\% \text{ mol } (ENR)) \cdot (pph \ (ENR))}{1000} \leq 3.75$$

wherein the % mol (ENR) is the mole % epoxidation of the ENR; and
wherein the pph (ENR) is the parts per hundred total rubber of the ENR and the pph(ENR) ranges between about 35 and about 75.

8. An article of manufacture according to claim 7, further comprising a component of a non-reinforcing filler in the amount ranging between about 7 and about 40 parts per hundred rubber.

* * * * *